United States Patent

Johnson

[15] 3,635,112
[45] Jan. 18, 1972

[54] DECAMBER MACHINE

[72] Inventor: Norman D. Johnson, Chula Vista, Calif.
[73] Assignee: Rohr Corporation, Chula Vista, Calif.
[22] Filed: May 25, 1970
[21] Appl. No.: 40,104

[52] U.S. Cl. ...................83/402, 83/420, 83/421, 83/451, 83/482, 83/487, 83/508, 83/513, 83/648
[51] Int. Cl. .................B23d 15/06, B23d 19/02
[58] Field of Search..................83/402, 401, 420, 421, 433, 83/449, 431, 451, 475, 476, 477, 471, 482, 487, 508, 513, 517, 648, 484, 485, 488, 489

[56] References Cited

UNITED STATES PATENTS

| | | | |
|---|---|---|---|
| 1,611,960 | 12/1926 | Thomas | 83/485 X |
| 1,848,145 | 3/1932 | Steindorff et al. | 83/475 X |
| 2,515,979 | 7/1950 | Bianchi | 83/485 X |
| 3,120,915 | 2/1964 | Horn et al. | 83/488 X |

*Primary Examiner*—Frank T. Yost
*Attorney*—George E. Pearson

[57] ABSTRACT

A table with a flat bed of substantial length, for example, 50 feet, has a shear blade fixedly mounted along each edge thereof, the cutting edges of the shear blades being parallel and spaced apart by a distance equal to the desired trimmed width of a worksheet to be trimmed thereon. Centering means centers a worksheet placed on the bed, and vacuum chucking means anchors such worksheet to the bed with marginal portions of the sheet overlying the shear blades. Compressed air may be introduced into the vacuum chucking means when centering a worksheet or moving such sheet along the bed to provide air bearing support for such sheet. The carriage drive means also may be used to draw a worksheet onto, and remove it from the bed.

A pair of power-driven cutter carriages are mounted for synchronized guided movement, one along each side of the machine. Each carriage has a cutter wheel mounted for shearing engagement with one of the shear blades for simultaneously trimming both lateral edges of a worksheet to a condition of straightness and parallelism with each other.

A presser roller moving ahead of each cutter wheel tends to flatten the worksheet and remove wrinkles.

13 Claims, 7 Drawing Figures

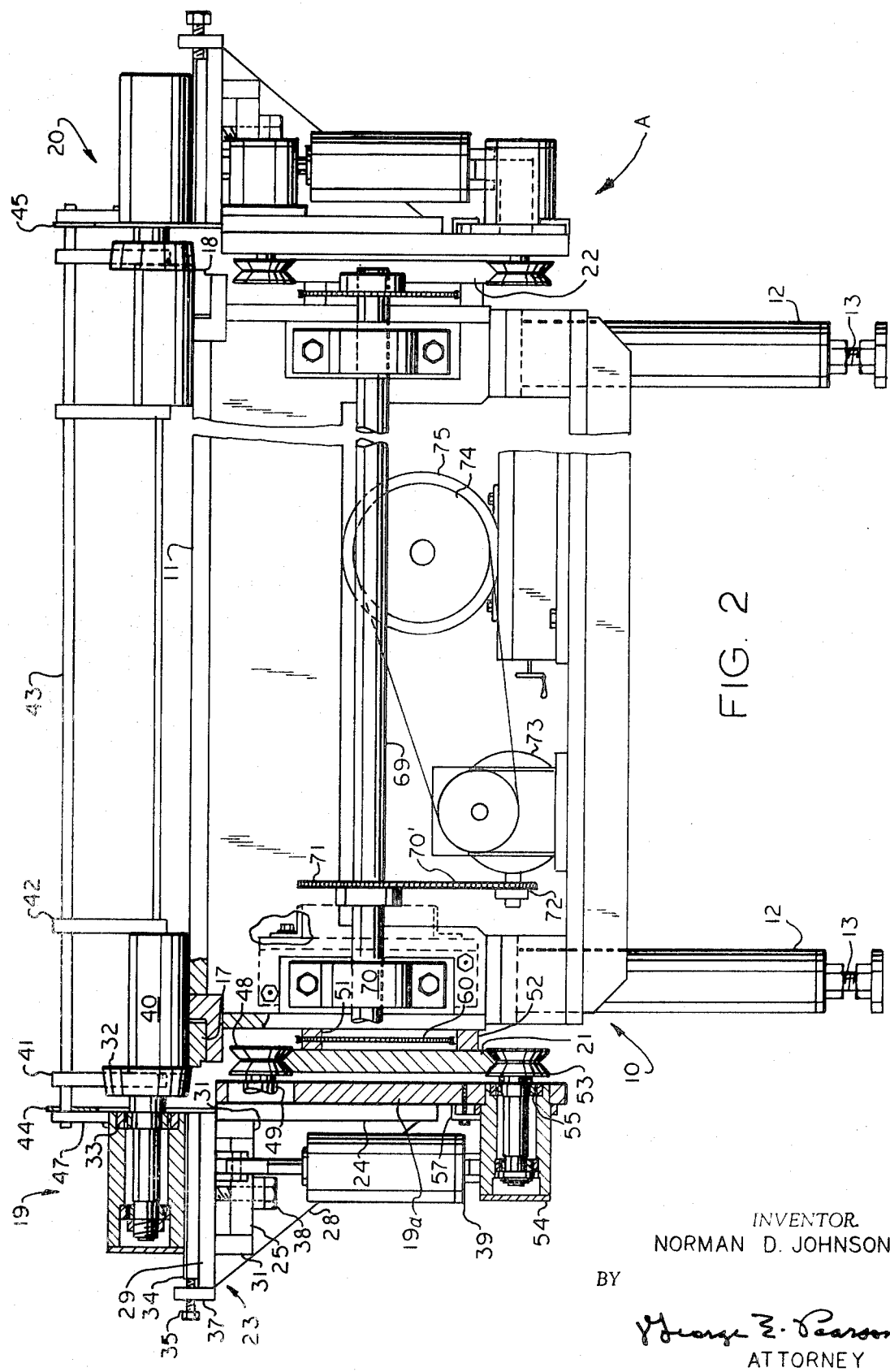

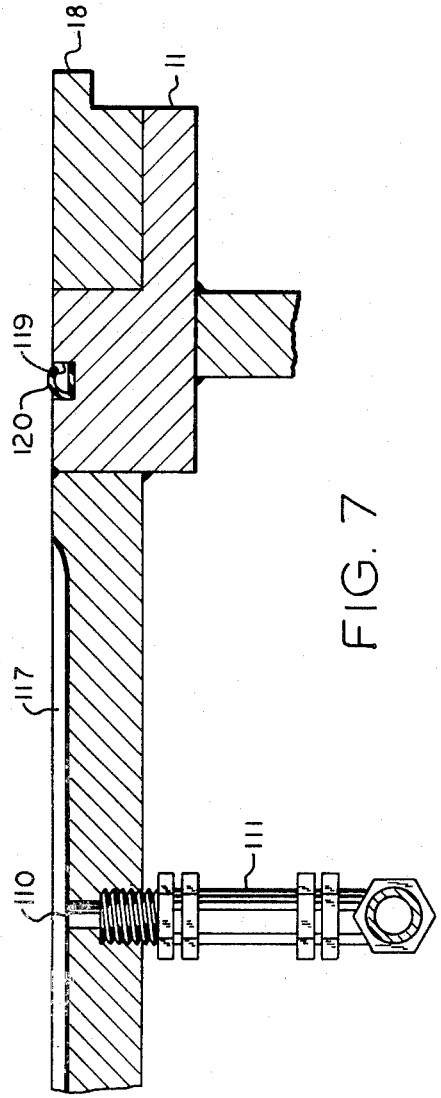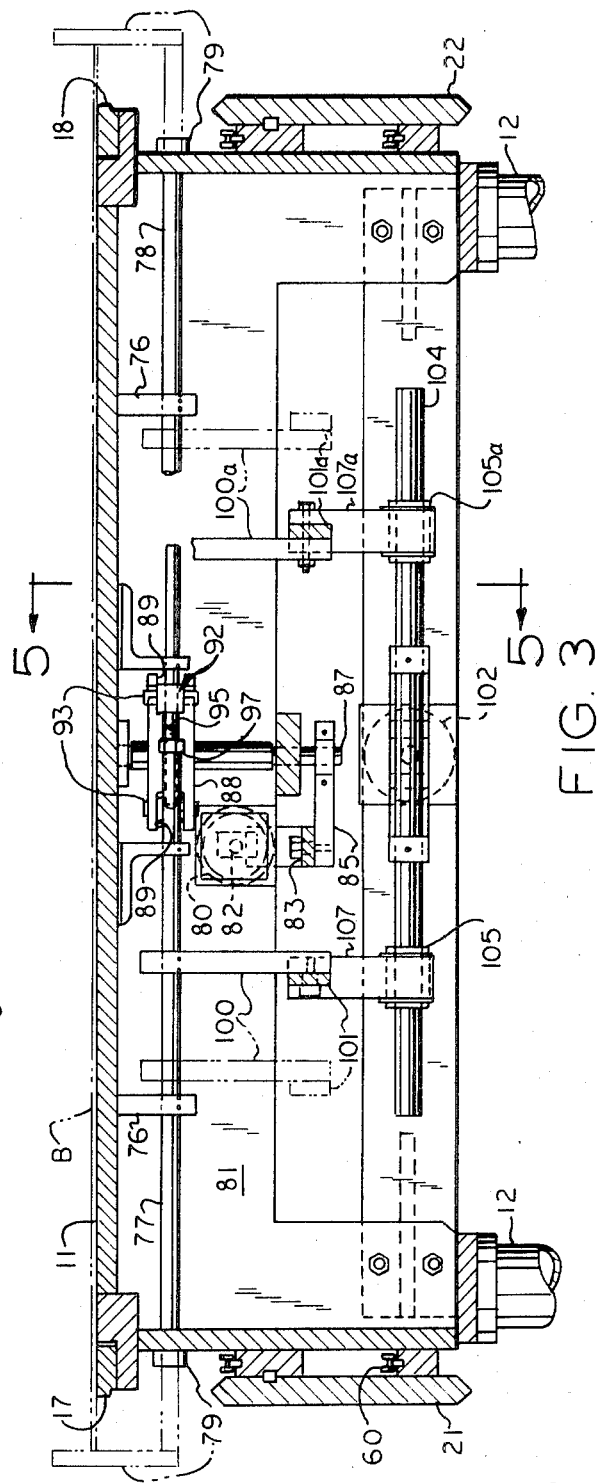

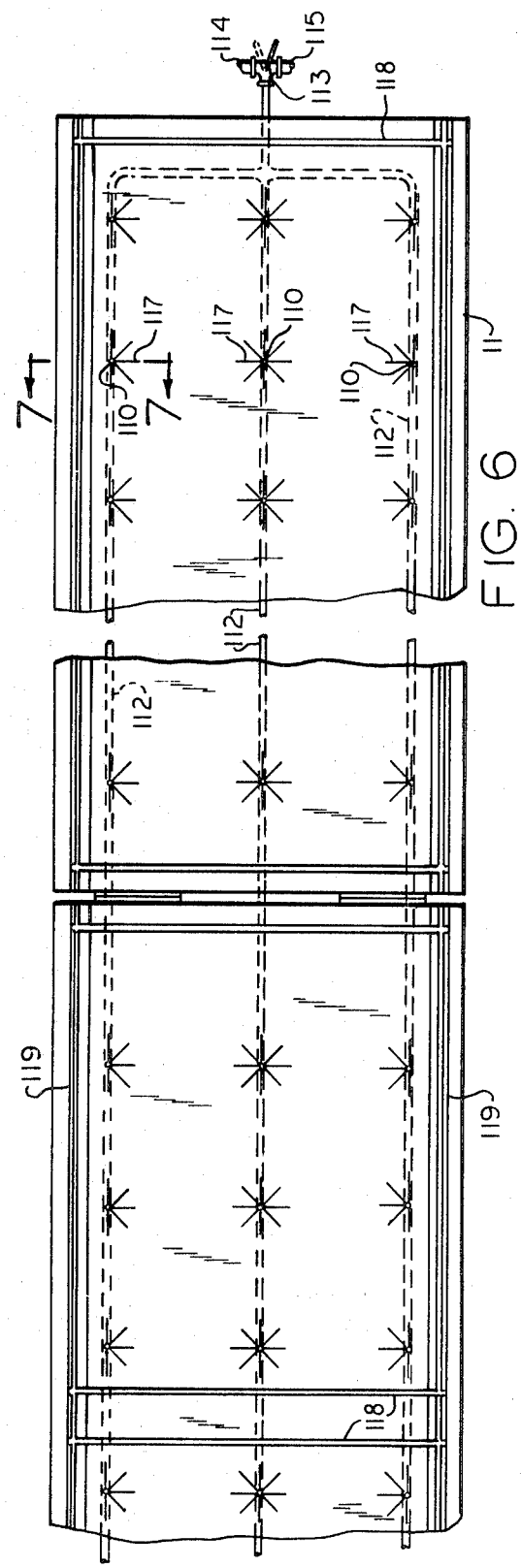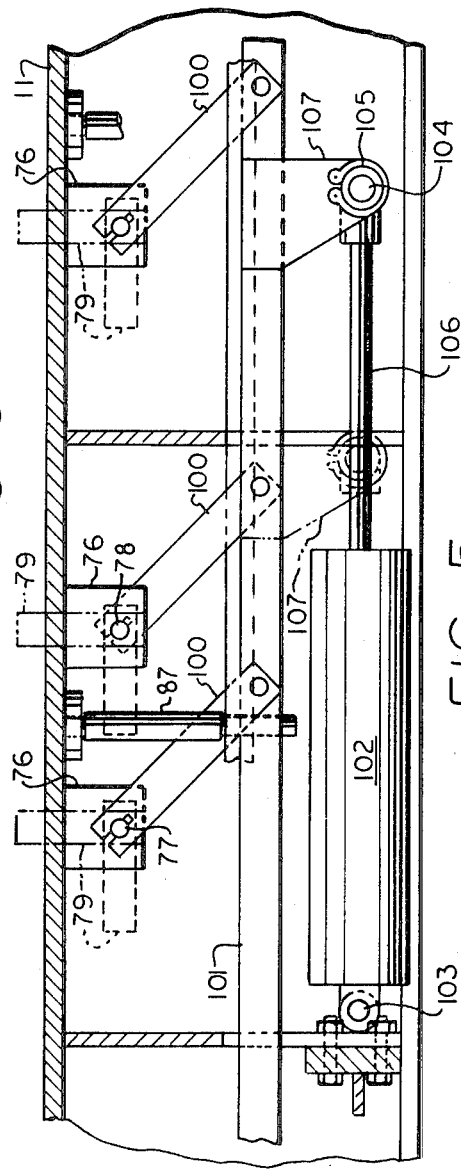

DECAMBER MACHINE

BACKGROUND OF THE INVENTION

The word "camber" as used herein means the deviation from a straight line of the lateral edges of a sheet metal workpiece the amount of camber being measured as the maximum deviation from a straight line of the concave edge of the sheet. The present decamber machine therefore is one which trims the edges of a sheet metal workpiece to remove or reduce such camber. Commercially available large steel sheets generally have an allowable camber of 1⅞inches in a 50-foot length. While such camber is tolerable for many applications, it is entirely unsatisfactory for others.

The removal of camber from large metal sheets is difficult because the sheets are unwieldy, are not adapted to ordinary shearing procedures, and are not readily secured to a machine for trimming. In the past, various expedients have been employed for trimming the edges of large sheets to bring their lateral edges into a condition of straightness and parallelism, but many such machines are clumsy and unwieldy and apt to damage the worksheets being processed.

SUMMARY OF THE INVENTION

Primary objectives of the invention are to provide an improved mechanism for trimming the lateral edges of large metal worksheets to remove camber, for firmly anchoring worksheets of different sizes for trimming, and for facilitating placement and removal of worksheets on the mechanism.

BRIEF DESCRIPTION OF THE DRAWINGS

The foregoing objectives and advantages of the invention will be apparent from the following description and the accompanying drawings, wherein:

FIG. 2 is an end elevational view looking toward the right-hand end of FIG. 1, intermediate and other portions being broken away.

FIG. 3 is a sectional view taken along line 3—3 of FIG. 1, portions being broken away.

FIG. 5 is an enlarged, fragmentary sectional view taken along line 5—5 of FIG. 3, and showing principally the mechanism for swinging the worksheet centering arms between their upright and horizontal positions, the centering arms being shown in dash lines in their downswung, inoperative position and in dash-two-dot lines in their upswung, operative position.

FIG 6 is a plan view in reduced scale of the bed, showing the combined vacuum clutch and air bearing support means for worksheets on the bed.

FIG. 7 is an enlarged, fragmentary, sectional view taken along line 7—7 of FIG. 6.

DETAILED DESCRIPTION OF DRAWINGS

Figure 1:
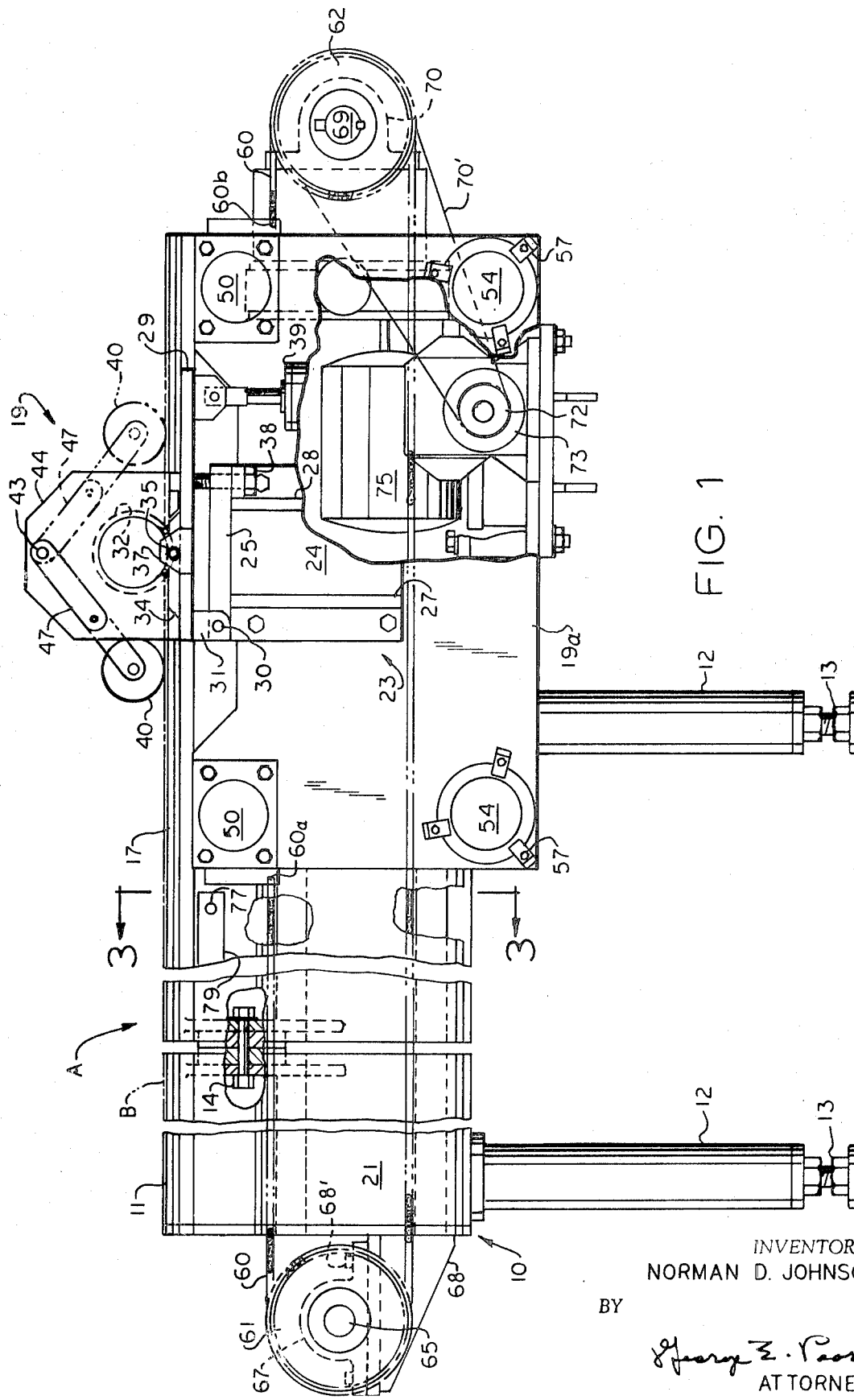
FIG. 1 is a side elevational view of a decamber machine embodying the invention, intermediate and other portions broken away.

Referring to the drawings in detail, a decamber machine A embodying the invention, see FIGS. 1 and 2, comprises an elongated table 10 having a flat, horizontal, work support bed 11, and support legs 12 with adjustable leveling screws 13. The table 10 is of desired width as determined by the width of a worksheet to be processed thereon, and of substantial length, for example, of the order of 50 feet. The table preferably is composed of a plurality of segments of selected length, interconnected by bolting as indicated at 14 in FIG. 1.

Hardened and precision ground shear blades 17 and 18, each of which may comprise a plurality of aligned blade segments of suitable length, are secured in seats provided along each edge of the bed 11. The cutting edges of the blades 17 and 18 face laterally outward, are parallel to each other, and are spaced apart by a distance equal to the desired trimmed width of worksheets to be processed by the machine A. A pair of cutter carriages 19 and 20 are mounted for rolling movement along track plates 21 and 22, respectively, one of which track plates is secured to extend along each side of the bed 11. Since the two cutter carriages 19 and 20, and their tracks and drive mechanisms are similar, but reversed, only the one 19 is described in detail herein.

The cutter carriage 19 comprises a strong, rigid upright main frame plate 19a to which is securely bolted a cutter support frame 23 which may be a weldment of heavy steelplate. This frame 23, as shown in FIGS. 1 and 2, comprises an upright plate portion 24, a horizontal plate portion 25, and a pair of triangular support brackets 27 and 28 for strength and rigidity.

A cutter mounting plate 29 is hingedly mounted on the carriage frame 23 by a pintle 30 and hinge brackets 31 to overlie the horizontal frame top plate 25. A cutter wheel 32 is journaled in a bearing 33 mounted on a dovetailed slide 34, which in turn is mounted in undercut ways on the hinged mounting plate 29. For adjustment of the cutter wheel 32 toward and away from its shear blade 17, a screw 35 is screwed into a threaded hole provided in an abutment 37 on the tilting cutting mounting plate 29 and bears endwise against the outer end of the slide 34.

Another screw 38, screwed upwardly through a threaded hole provided in the top frame plate 25 limits downward swinging movement of the cutter mounting plate 29 and its cutter wheel 32, while a fluid-actuated cylinder 39, pivotally mounted at its lower end on a bracket welded to the carriage main plate 19a, and pivotally connected at its upper end to the free end of the hinged cutter mounting plate 29, provides means for moving the cutter wheel 32 between an elevated position clear of a worksheet B on the bed 11, and a lowered, adjusted cutting position as shown in FIG. 1.

A presser roller 40 is journaled between the free ends of a pair of spring-biased, swingover arms 41 and 42, see FIGS. 1 and 2, to ride on a worksheet B directly ahead of the cutter wheel 32 during a cutting operation to flatten out the worksheet and remove wrinkles. The arms 41 and 42 are fixedly secured to a shaft 43, which is journaled at its ends in a pair of roller support plates 44 and 45 mounted on the cutter carriages 19 and 20, respectively.

For exerting a powerful downward pressure on the rollers 40 when the cutter carriages are moving toward the left during a cutting operation as shown in FIG. 1, a heavy duty spring arm 47 is secured to each end of the shaft 43 and its free end is swung downwardly under powerful pressure and latched in the position shown in solid lines in FIG. 1. When the spring arms 47 are unlatched and swung over in a clockwise direction to their broken line position of FIG. 1, and the spring arms 47 are swung downward under powerful pressure and latched in their broken line position of FIG. 1, they exert a downward pressure on the rollers 40 for movement of the carriage during a cutting operation in the opposite direction, or toward the right as shown in FIG. 1.

For mounting the cutter carriage 19 on its track plate 21, a pair of similar, upper, V-grooved support rollers 48 are fixedly mounted on shafts 49 which are journaled in ball bearings 50 fixedly secured in openings provided in the upright, carriage main frame plate 19a. These upper grooved rollers 48 ride along the inverted V-shape upper edge of the track plate 21, which extends substantially the entire length of the bed 11, and is fixedly mounted on spacer blocks 51 and 52 secured to the bed.

A pair of generally similar, lower, V-grooved guide and holddown rollers 53 are similarly journaled in ball bearing housings 54 and ride along the V-shape lower edge of the carriage track plate 21. The lower bearing housings 54 are provided with eccentric end portions 55, which fit for rotive adjustment into holes provided in the upright carriage main frame plate 21, and are secured in rotatively adjusted position therein by clamp fingers 57, see FIG. 1. Screws holding the clamp fingers 57 may be loosened to permit rotative adjustment of the eccentrically mounted bearing housing 54 to bring their respective V-grooved rollers 53 into close, adjusted relation with the lower edge of the track plate 21, after which the screws are again drawn down tight to secure the housings in adjusted position.

A drive mechanism for driving the cutter carriage 19 back and forth along its track plate 21 comprises a roller link drive chain 60, which is passed around a tail sprocket 61 mounted for adjustment on one end of the bed 11, and also around a power driven head sprocket 62 which is mounted on the other end of the table 10. The sprockets 61 and 62 are offset laterally inwardly from the track plate 21, as best shown in FIG. 2, and the ends 60a and 60b of the upper run of the drive chain, see FIG. 1, are secured as by pinning to the carriage 19.

To provide for taking up slack in the carriage drive chain 60 both tail sprockets 61 are secured to opposite ends of a common shaft 65, see FIG. 1, which is journaled in pillow blocks 67 mounted for slidable adjustment on brackets 68 secured to the end of the table 10. Each pillow block 67 is anchored to its supporting bracket by a pair of screws 68', see FIG. 1, which are inserted through longitudinally slotted holes provided in the pillow block 67, and are screwed into threaded holes provided in the supporting bracket. Upon loosening the screws 68' the pillow blocks 67 can be moved either outwardly or inwardly as required to adjust the tension of the carriage drive chains.

The head sprockets 62 are keyed to opposite end of a reversibly motor-driven shaft 69, see FIGS. 1 and 2, which is journaled in pillow blocks 70 secured to the end of the table 10. The shaft 69 is driven by a chain 70' passed around a sprocket 71 secured thereon, and also around the power takeoff sprocket 72 of a conventional speed-reduction mechanism 73. The latter is driven by a variable speed, belt drive mechanism 74 of a well-known type from a reversible electric motor 75.

Figure 4:
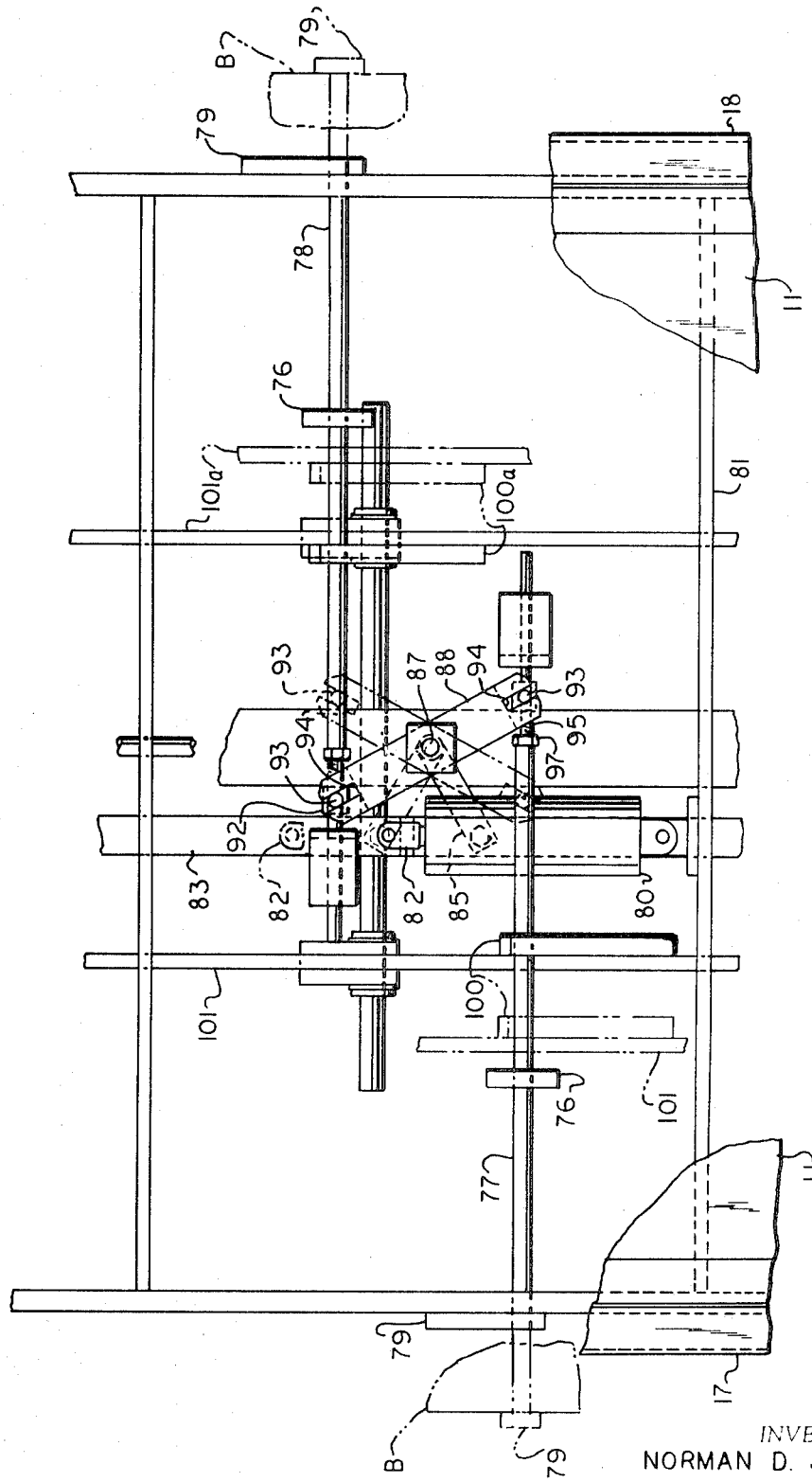
FIG. 4 is a plan view of the fragment shown in FIG. 3.

Mechanism for centering a worksheet B on the bed 11, see FIGS. 3–5, comprises a plurality of oppositely axially extensible, and retractable, and rotatively adjustable pairs of centering rods 77 and 78, see FIGS. 4 and 5, each of which is mounted for axial slidable movement transversely of the bed 11 in slide bearings mounted in a pair of brackets 76 secured to the underside of the bed 11. Each centering rod has a laterally extending, worksheet engaging arm 79 on its outer end. These pairs of centering rods are mounted at selected, spaced intervals throughout the length of the bed 11, for example, one pair every 4 feet.

For selectively axially extending and retracting all of the centering rods 77 and 78 in unison, a first air cylinder 80, see FIGS. 3 and 4, is pivotally mounted on a table element 81, with the piston rod 82 thereof pivotally connected to a push-pull link 83, which extends lengthwise throughout substantially the entire length of the table 10.

Between each oppositely extending pair of centering rods 77 and 78 the push-pull link 83, see FIGS. 3 and 4, is pivotally connected to the free end of an arm 85, the other end of which is secured to extend radially from a pivot pin 87 having bearing support on table 10. A centering rod actuator 88, in the form of a square rod, has a deep notch 89, see FIG. 3, in each end thereof, and is fixedly mounted medially of its length on the pivot pin 87.

A square block 92 is fitted into each deep endwise notch 89, see FIGS. 3 and 4, in the actuator 88, and each block 92 has a pin 93 secured in a hole vertically through the block to ride in endwise extending notches 94, see FIG. 4, in the upper and lower portions of the block 92 defining the deep end notches 89, see FIGS. 3 and 4. The notches 89 and 94 are sufficiently deep to permit swinging movement of the actuator 88 to extend and retract the axially slidable centering rods 77 and 78. A threaded extension 95 is screwed into an end of each block 92, and also into a threaded axial socket provided in the inner end of each centering rod 77 and 78. Each threaded extension 95 is anchored in adjusted position in its socket in the centering rod by a locknut 97. Thus, the square blocks 92, riding in the their deep notches 89 in the ends of the actuator 88, retain the pins 93 in their notches 94 in the actuator during extension and retraction of the centering rods 77 and 78, while the latter rods are free to swing their work-engaging arms 79 up or down as required.

For swinging the worksheet engaging arms 79 of the centering rods up and down as required, and arm 100 is fixedly secured to each centering rod 77 and 78, the arms 100 for each set of centering rods being aligned lengthwise of the machine A. Since the mechanisms for swinging both sets of centering rods 77 and 79 are identical, but reversed, only that for the left-hand set of centering rods 77 as shown in FIGS. 3, 4 and 5 is described herein. Corresponding parts of the mechanism for swinging the other centering rods 78 are designated by the same reference numerals with the suffix "a" added.

A pair of push-pull links 101 and 101a, see FIG. 3, extend substantially throughout the entire length of the machine A and are pivotally connected to the aligned free ends of all of the arms 100 and 100a, respectively. For actuating the push-pull links 101 and 101a, see FIG. 3, while still permitting the centering rods 77 and 78 to move axially in and out upon actuation of the first fluid-actuated cylinder 80, a second fluid-actuated cylinder 102, see FIGS. 3 and 5, is pivotally mounted at 103 on a table element, see FIG. 5. A crosshead 104, see FIG. 3 and 5, is secured transversely to the outer end of the piston rod 106 of this second cylinder 102, and this crosshead is fitted for rotative and axially slidable movement in bearings 105 and 105a provided on brackets 107 and 107a in the push-pull links 101 and 101a, respectively.

Thus, upon actuation of the second cylinder 102 to extend the piston rod 106, the brackets 107 and 107a are moved to their solid line position of FIG. 5, thereby causing the push-pull links 101 and 101a to swing the work-engaging arms 79 to their dash line downswung or retracted position of FIG. 5. Actuation of said second cylinder 102 to retract the piston rod 106 moves the brackets 107 and 107a to their dash-two-dot position of FIG. 5, 5 swings the arms 79 upright to their dash-two-dot, upright or worksheet-engaging position of FIG. 5.

For centering a worksheet B on the bed 11, the centering rods 77 and 78 are first extended axially outwardly by actuation of the first cylinder 80 to swing the actuator 88 to its dash line position of FIG. 4, the bearings 105 and 105a moving slidably outwardly on the crosshead 106. The second cylinder 102 is then actuated to retract the piston rod 106 and move the push-pull links 101 and 101a to the left as shown by the brackets 107 in dash-two-dot lines in FIG. 5, thereby swinging the work-engaging arms 79 upright to their sheet-engaging position shown in dash-two-dot lines in FIG. 5. The first cylinder 80 is then actuated to retract the centering rods 77 and 78 to draw the work-engaging arms 79 inwardly, urging the worksheet B toward centered position between them on the bed 11. The force of the first cylinder 80 is so regulated as to prevent the arms 70 from crushing the edges of the work sheet.

After a worksheet B has thus been centered on the bed 11, it is anchored to the bed 11 by vacuum chuck means to be described later herein, after which the centering rods 77 and 78 are moved axially outwardly by the first cylinder 80 sufficiently to free the worksheet B, are swung downwardly clear of the worksheet, and finally are fully retracted.

The vacuum chucking means comprises three rows of holes 110 drilled through the bed 11 and counterbored and tapped at their lower ends as shown in FIG. 7 to receive T-fittings 111, which as shown in FIG. 6, are connected by suitable tubing 112 to connect all of the holes 110 via a usual two-way valve 113, see FIG. 6, to suitable source of vacuum, such as a suction line 114 or vacuum pump, not shown, and also, preferably to a compressed air source, such as a conventional compressed air line 115 as found in most shops where a machine of the present type is used. To increase the effective area of each hole 110, a plurality of grooves 117, which may be approximately one thirty-second inch deep and several inches long, are machined in the upper surface of the bed to radiate from each hole 110.

For damming off selected areas of the bed 11 to provide a plurality of separate chucking zones for sheets of different lengths, a plurality of transversely and longitudinally extending grooves 118 and 119 are machined into the upper surface of the bed 11 to bound selected areas thereof. These grooves are designed to receive resilient sealing strips 120 in seated relation therein, see FIGS. 6 and 7. The sealing strips are of rubber or rubberlike material, and are fitted into selected ones of the grooves 118 and 119 to provide a sealing boundary around one or more selected suction zones. By this arrangement worksheets of varying lengths can be chucked, either singly or in selected pluralities, for trimming on the machine A.

OPERATION

With the machine A set up as shown in FIGS. 1–3 for trimming one or more worksheets B thereon, sealing strips 120 of suitable length are fitted into selected grooves 118 and 119 to enclose a selected zone or zones of the bed 11 corresponding as nearly as possible to the size of each work sheet to be trimmed. A worksheet B is then positioned to overlie each such zone, and each worksheet must entirely cover its respective zone in order for the vacuum chucking means to be effective. The worksheet or sheets are centered transversely of the bed 11 by actuating the first fluid-actuated cylinder 80, see FIGS. 4–6, to extend the centering rods 77 and 78, then the second cylinder 102 to swing the work-engaging arms 79 to upright position, and next the first cylinder 80 to retract on the bed 11. The centering rods 77 and 78 are then retracted and the tubing 112, see FIG. 6, is communicated with vacuum line 114 by means of the valve 113 to evacuate the zone between the bed and the worksheet which is bounded by the sealing strips 120 and thus anchor the worksheet B to the bed 11.

During the positioning of a worksheet B on the bed 11 the cutter wheels 32 are elevated clear of their shear blades 17 and 18 by actuation of the cylinders 39 to permit such worksheet B to be manipulated without encountering the cutter wheels.

With one or more worksheets B centered on, and anchored to the bed 11, the cutter carriages 19 and 20 are moved to a selected end of the bed 11 by their respective drive chains 60 and are there lowered by means of their cylinders 39, FIGS. 1 and 2, to bring the cutter wheels 32 into proper shearing relation with their respective shear blades 17 and 18. At the same time the presser rollers 40 are swung to a position ahead of the cutter wheels 32 in the desired direction of travel and are biased downwardly by means of their spring arms 47.

The variable speed drive means 74 is adjusted to provide a proper cutting speed, and the motor 75 is energized to drive the chains 60 in the desired direction to move the cutter carriages 19 and 20 along the machine A to trim off edge portions of the work sheet B which extend laterally beyond the shear blades 17 and 18. When the cutter carriages 19 and 20 move beyond a trimmed work sheet, the latter may be removed and replaced by another requiring trimming.

For replacing a worksheet B on the bed 11, the vacuum to the tubing 112 is shut off, and the tubing preferably is connected to the compressed air line 115. By this means the vacuum chucking means now becomes an air bearing means, which tends to float a worksheet B on the bed on a cushion of air and thus greatly facilitates handling of such worksheets on and off of the bed.

For moving worksheets lengthwise of the machine A onto and off bed 11, a clamp, not shown, of a conventional type may be attached to such worksheets, and then either directly or by means of suitable cable and pulleys to either or both of the cutter carriages 19 and 20. Since such tackle can be readily provided by any routing worker, the details thereof, are omitted to avoid unnecessarily complicating the disclosure.

A machine embodying the invention, while large, is easy and inexpensive to operate, has large volume, and provides true, accurate trimming of these large, unwieldy, easily damaged sheets.

While not illustrated or described herein, it will be obvious to one familiar with the art, that since the two side portions of the machine are relatively independent of each other, it is entirely feasible to make the tabletop portion laterally expandable to permit the trimming of sheets to varying widths. Since, however, the provision of such an expandable table structure would be well within the capabilities of an ordinary mechanical engineer conversant with machine design, and since further, such adjustment is not ordinarily required, it is neither illustrated nor described herein.

Having now fully disclosed my invention, what I claim as new and useful and desire to protect by U.S. Letters Patent is:

1. A machine for decambering large metal sheets comprising, a bed of substantial length for supporting thereon a metal worksheet having an untrimmed width greater than a selected trimmed width, a shear blade mounted to extend lengthwise along each side of the bed, each shear blade having a shearing edge thereon, the shear blades being mounted with their shearing edges parallel and spaced apart by a distance equal to the selected trimmed width of such worksheet, a cutter carriage mounted at each side of the bed for movement therealong parallel to the shear blades, a cutter mounted on each carriage for shearing engagement with the shear blade on the same side of the bed as the carriage upon which the cutter is mounted as the carriages move the lengthwise along the bed, and power drive means for driving the carriages in unison lengthwise along the bed for trimming off portions of such work sheet which extend laterally beyond the shearing edges of the shear blades.

2. A decambering machine as claimed in claim 1 wherein each carriage is mounted for rolling, guided movement on a track rigidly secured, one to each side of the bed.

3. A decambering machine as claimed in claim 2 wherein each track is a strong, rigid plate mounted in upright position, a first pair of grooved rollers mounted on each carriage for rolling, guiding, supporting engagement with the upper edge of their respective track plates, and a second pair of grooved rollers mounted on each carriage in rolling, guiding engagement with the lower edge of their respective track plates.

4. A decambering machine as claimed in claim 1 wherein a strong rigid cutter support frame is mounted on each cutter carriage, a cutter support base mounted for vertical adjustment on each support frame, each cutter being mounted on one of the support bases, and controlled power means operatively interposed between each cutter support base and its cutter support frame for moving the support base and its cutter between a lowered position with the cutter operatively engaging its shear blade, and an elevated position with the cutter upwardly clear of a worksheet on the bed.

5. A decambering machine as defined in claim 1 wherein the bed has a seal strip receiving groove therein extending lengthwise adjacent each longitudinal edge thereof, and has also a plurality of similar grooves extending transversely across the bed from one of the longitudinal grooves to the other to define, with the longitudinal grooves, worksheet-receiving areas of the bed, a sealing strip fitted into selected ones of the grooves to bound at least one area of the bed selected for the mounting of a work sheet thereon, and vacuum means communicating through openings in the bed with a worksheet-supporting surface of the bed within a selected area thereof bounded by such sealing strips fitted into such grooves for vacuum chucking of a worksheet supported on, and covering entirely, such selected bed area.

6. A decambering machine as claimed in claim 5 wherein a supply of pressurized air is connected through one side of a two-way valve to such bed openings, and a source of vacuum is connected through the other side of said valve to such bed openings for selectively evacuating, and supplying air at superatmospheric pressure, to a zone above such bed openings.

7. A decambering machine as claimed in claim 1 wherein a downwardly biased roller is mounted in closely spaced relation ahead of each cutter during a worksheet-trimming operation to roll along the bed and along a worksheet supported on the bed for trimming, thereby to urge such worksheet into closely superimposed, wrinkle-free relation with the bed.

8. A decambering machine as defined in claim 7 wherein the rollers are mounted on a swing-over support for positioning the rollers ahead of the cutters for movement selectively in either direction lengthwise of the bed.

9. A decambering machine as claimed in claim 1 wherein a plurality of laterally oppositely extensible pairs of centering rods are mounted at selected spaced intervals lengthwise of the bed, actuating means mounted to selectively extend and retract the centering rods of each pair thereof in unison, and worksheet-engaging means mounted on the outer end of each centering rod for engaging an edge of a worksheet supported on the bed and urging each worksheet toward centered position on the bed.

10. A decamber machine as claimed in claim 9 including means operatively interconnecting all of the centering rod actuating means for selectively extending and retracting all of the centering rods in unison.

11. A decambering machine as claimed in claim 10 wherein the centering rods of each pair thereof are mounted for axial slidable extension and retraction in opposite directions transversely of the bed, the actuating means for extending and retracting the centering rods of each pair thereof comprises an actuator pivotally supported between each pair of the centering rods, and all of the actuators are operatively connected to a push-pull member extending longitudinally of the bed for extension and retraction of the centering rods in unison upon actuation of the push-pull member.

12. A decambering machine as claimed in claim 9 wherein a worksheet-enagaging arm is mounted on the laterally outward end of each centering rod for pivotal movement between upright and downswung position, each of said worksheet-engaging arms being of a length when swung to upright position to engage a worksheet supported on said bed, and actuating means operatively connected to swing said arms between their upright, worksheet-engaging position, and downswung position below the level of a worksheet mounted on said bed.

13. A decambering machine as claimed in claim 12 wherein each worksheet-engaging arm is secured to its respective centering rod, each centering rod is mounted for combined rotative and axial slidable movement, a lever arm is secured at one end thereof to each centering rod, a pair of push-pull links are pivotally connected one to the lever arms secured to all of the centering rods extensible toward each side of the bed, and controlled means for actuating the two push-pull links in unison, selectively to rotatively move the centering rods in one direction to swing the work-engaging arms to their upright position, and in the other direction to swing the work-engaging arms to their downswung position.

* * * * *